(12) United States Patent  
Du

(10) Patent No.: US 11,993,259 B2  
(45) Date of Patent: May 28, 2024

(54) VEHICLE SPEED CONTROL METHOD AND APPARATUS

(71) Applicant: Venti Technologies Corporation, Weston, MA (US)

(72) Inventor: Xinxin Du, Suzhou (CN)

(73) Assignee: Venti Technologies Corporation, Weston, MA (US)

( * ) Notice: Subject to any disclaimer, the term of this patent is extended or adjusted under 35 U.S.C. 154(b) by 423 days.

(21) Appl. No.: 17/407,017

(22) Filed: Aug. 19, 2021

(65) Prior Publication Data

US 2022/0144268 A1    May 12, 2022

Related U.S. Application Data

(63) Continuation of application No. PCT/CN2019/115906, filed on Nov. 6, 2019.

(30) Foreign Application Priority Data

Feb. 20, 2019 (CN) .......................... 201910127399.2

(51) Int. Cl.
*B60W 30/14* (2006.01)
*B60W 30/09* (2012.01)

(52) U.S. Cl.
CPC .......... *B60W 30/146* (2013.01); *B60W 30/09* (2013.01); *B60W 2520/10* (2013.01); *B60W 2520/125* (2013.01); *B60W 2540/18* (2013.01); *B60W 2552/53* (2020.02); *B60W 2555/60* (2020.02); *B60W 2720/10* (2013.01)

(58) Field of Classification Search
None
See application file for complete search history.

(56) References Cited

U.S. PATENT DOCUMENTS

2013/0253815 A1\* 9/2013 Orfila .................... G08G 1/163  
    701/301  
2019/0217854 A1\* 7/2019 Park .................... B60W 30/045

FOREIGN PATENT DOCUMENTS

| CN | 1683194 A | 10/2005 |
| CN | 103121447 A | 5/2013 |
| CN | 105667509 A | 6/2016 |
| CN | 107331182 A | 11/2017 |

(Continued)

*Primary Examiner* — Peter D Nolan  
*Assistant Examiner* — Michael F Whalen  
(74) *Attorney, Agent, or Firm* — Womble Bond Dickinson (US) LLP

(57) ABSTRACT

A vehicle speed control method, the method comprises: when a vehicle body is in a normal state, determining a first vehicle speed of the vehicle body based on road safety information; acquiring a driving segment of the vehicle body, and determining a pose variation amount of the vehicle body within the driving segment; determining a tangential acceleration of the vehicle body within the driving segment according to a correlation between the pose variation amount of the vehicle body and the tangential acceleration of the vehicle body; when the tangential acceleration of the vehicle body reaches a preset maximum tangential acceleration, determining a second vehicle speed of the vehicle body; and determining whether the second vehicle speed is smaller than the first vehicle speed, and if the second vehicle speed is smaller than the first vehicle speed, determining the second vehicle speed to be a target vehicle speed.

18 Claims, 12 Drawing Sheets

(56) References Cited

FOREIGN PATENT DOCUMENTS

| | | |
|---|---|---|
| CN | 107891860 A | 4/2018 |
| CN | 108088456 A | 5/2018 |
| CN | 109017780 A | 12/2018 |
| CN | 109733411 A | 5/2019 |
| WO | 2013011615 A1 | 1/2013 |

* cited by examiner

VEHICLE SPEED CONTROL METHOD AND APPARATUS

CROSS REFERENCE TO RELATED APPLICATIONS

This application is a continuation application of International Application No. PCT/CN2019/115906, filed on Nov. 6, 2019, which claims priority to Chinese Application No. 201910127399.2, filed on Feb. 20, 2019, both of which are incorporated by reference herein.

TECHNICAL FIELD

The present disclosure relates to the field of unmanned driving technologies, and in particular, to a vehicle speed control method and device.

BACKGROUND

With the development of sensor and computer technologies, the unmanned driving technologies have been applied to agriculture, industry, and other fields. An unmanned driving process includes sensing the position of a vehicle body through a sensor, and driving along desired paths from a start point to an end point by controlling driving speed and steering through related motion control methods. The motion control includes longitudinal control and lateral control. The longitudinal control refers to realizing precise following of a desired vehicle speed through coordination of an accelerator and a brake, and the lateral control realizes path tracking of an unmanned driving vehicle.

In the related art, in the motion control of the unmanned driving vehicle, which variable speed should be adopted to avoid obstacles safely when encountering an obstacle is taken into consideration mostly, but the problem of vehicle speed control under a plurality of factors such as passenger comfort is not yet taken into consideration. Therefore, application of the unmanned driving vehicle motion control in the related art is limited.

SUMMARY

In order to overcome the problem in the related art, the present disclosure provides a vehicle speed control method and device.

According to a first aspect of an embodiment of the present disclosure, there is provided a method vehicle speed control method, including: in response to a vehicle body being in a normal state, determining a first vehicle speed of the vehicle body based on road safety information; acquiring a travel section for the vehicle body to determine a pose variation amount of the vehicle body in the travel section; determining a tangential acceleration of the vehicle body in the travel section according to a correspondence between the pose variation amount of the vehicle body and the tangential acceleration of the vehicle body; in response to the tangential acceleration of the vehicle body reaching a preset maximum tangential acceleration, determining a second vehicle speed of the vehicle body; and judging whether the second vehicle speed is smaller than the first vehicle speed, and in response to the second vehicle speed being smaller than the first vehicle speed, determining the second vehicle speed as a target vehicle speed, or in response to the second vehicle speed being greater than the first vehicle speed, determining the first vehicle speed as the target vehicle speed.

According to a second aspect of an embodiment of the present disclosure, there is provided a vehicle speed control device, including: a processor; and a memory configured to store an instruction executable for the processor, wherein the processor is configured to perform the above method.

According to a third aspect of an embodiment of the present disclosure, there is provided a non-transitory computer-readable storage medium, wherein when an instruction in the storage medium is executed by a processor, the processor is enabled to perform the above method.

Technical solutions provided in embodiments of the present disclosure may include the following beneficial effects: in response to a vehicle body being in a normal state in the present disclosure, a first speed of driving of the vehicle body is determined based on road safety information; and on the premise of ensuring safe driving, a target speed that meets a comfort requirement of a passenger is selected during comprehensive consideration of passenger comfort.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Exemplary embodiments will be described in detail herein, and examples of the embodiments are illustrated in the accompanying drawings. When the following description relates to the accompanying drawings, unless otherwise indicated, same numbers in different accompanying drawings represent same or similar elements. The implementations described in the following exemplary embodiments do not represent all implementations consistent with the present disclosure. Instead, they are merely examples of devices and methods consistent with some aspects of the present disclosure as described in detail in the appended claims.

To help a person skilled in the art understand the technical solutions provided in the embodiments of the present disclosure, a technical environment for implementing the technical solutions is described first below.

An unmanned driving vehicle body control technology includes simulating a skilled driver to drive, using detection devices to continuously preview a road ahead, determining a steering wheel rotation angle according to a curvature of a front path and current speed and pose information of the vehicle and the like, so as to allow a unmanned driving vehicle body to advance according to a planned path to the greatest extent. In an actual driving process, it is inevitable to encounter an obstacle, such as creatures or rubbles that suddenly appear, or sudden changes in road conditions, such as turns or ramps, and relevant measures need to be taken in time. In the related art, people use some speed control methods to avoid obstacles safely without comprehensively considering factors such as vehicle body states and passenger comfort, and consequently, the unmanned driving technology is limited in practical application.

Based on actual technical requirements similar to those described above, a vehicle speed control method provided in the present disclosure can integrate factors such as vehicle body states, passenger comfort, and vehicle body driving life, to control an unmanned driving vehicle speed, which is closer to the practical application.

Figure 1:
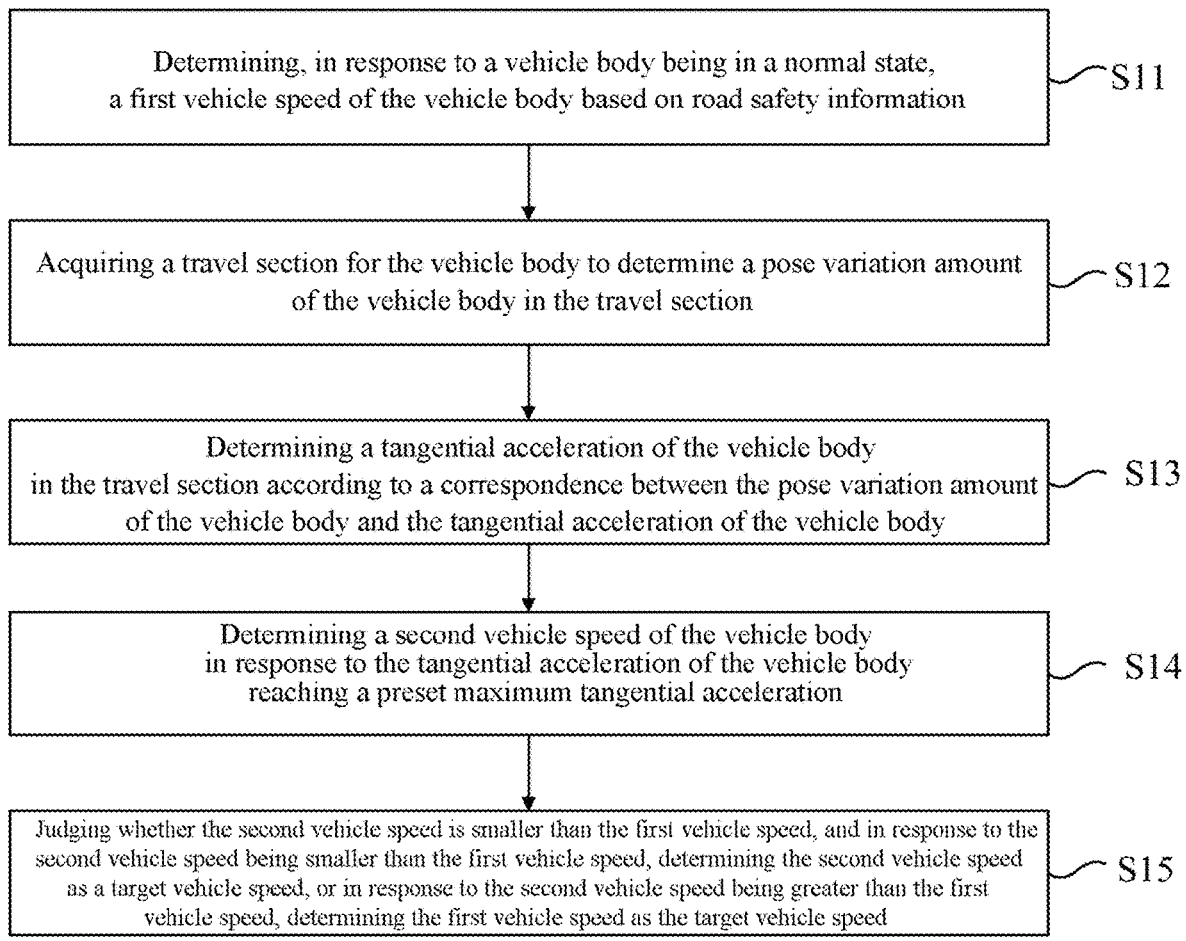
FIG. 1 is a flowchart of a vehicle speed control method according to an exemplary embodiment.

The vehicle speed control method provided in the present disclosure will be described in detail below with reference to FIG. 1. FIG. 1 is a method flowchart of an embodiment of the vehicle speed control method provided in the present disclosure. Although the present disclosure provides method operating steps shown in the following embodiment or drawings, more or fewer operating steps may be included in the method based on conventional effort or uninventive effort. In steps in which there is no necessary causality logically, the execution order of these steps is not limited to an execution order provided in this embodiment of the present disclosure.

Specifically, an embodiment of the vehicle speed control method provided in the present disclosure, as shown in FIG. 1, includes:

step S11 of determining, in response to a vehicle body is in a normal state, a first vehicle speed of the vehicle body based on road safety information;

step S12 of acquiring a travel section for the vehicle body to determine a pose variation amount of the vehicle body in the travel section;

step S13 of determining a tangential acceleration of the vehicle body in the travel section according to a correspondence between the pose variation amount of the vehicle body and the tangential acceleration of the vehicle body;

step S14 of determining a second vehicle speed of the vehicle body in response to the tangential acceleration of the vehicle body reaching a preset maximum tangential acceleration; and step S15 of judging whether the second vehicle speed is smaller than the first vehicle speed, and in response to the second vehicle speed being smaller than the first vehicle speed, determining the second vehicle speed as a target vehicle speed, or in response to the second vehicle speed being greater than the first vehicle speed, determining the first vehicle speed as the target vehicle speed.

In this embodiment of the disclosure, the normal state of the vehicle body includes a state in which the vehicle body is stable in running without damages of parts, breakage of sensors, insufficient gasoline, or the like. The road safety information includes safely avoiding obstacles, driving without traffic line violation (not driving over a lane line or over-the-line), driving at a speed required by road traffic, and the like. When encountering an obstacle, such as a pedestrian, a pet, a rubble, a pothole, a construction site or a traffic accident that suddenly appears, obstacle avoidance may be performed by pulling over or changing lanes according to the size of the obstacle, and the vehicle speed may be reduced to zero. If the size of the obstacle is relatively large, and safe obstacle-avoidance cannot be implemented by changing lanes, then a manner of pulling over is adopted. According to a position of the obstacle, the speed may be reduced by adopting a constant acceleration during comprehensive consideration of the passenger comfort. In most cases, in order to maintain efficient running of the vehicle, obstacle-avoidance is implemented by changing lanes. Similarly, the driving speed and steering of the vehicle body are controlled, so that the vehicle body drives following a track within road dividing lines. Further, position coordinates of the vehicle body and the road information may be input into a pre-stored travel trace model to determine a travel trace of the vehicle body. According to the travel trace, a first vehicle speed that enables the vehicle body to follow the travel trace without deviation is determined.

In one embodiment, a laser radar and/or visual sensor mounted on the vehicle body may be used to detect a travel section for the vehicle body in a driving direction, and then simulate the travel trace of the vehicle body in the travel section, so that a pose variation of the vehicle body in the travel section is determined, and a tangential acceleration of the vehicle body in the travel section is determined according to a correspondence between the pose variation of the vehicle body and the tangential acceleration of the vehicle body, where the correspondence between the pose variation of the vehicle body and the tangential acceleration of the vehicle body may be obtained through pre-tests.

In this embodiment of the present disclosure, the maximum tangential acceleration is a maximum tangential acceleration that satisfies the passenger comfort, and the correspondence between the pose variation of the vehicle body and the tangential acceleration of the vehicle body may be obtained through tests. For example, in one embodiment, in order to ensure stability of driving of the vehicle body, there is a particular correspondence between a steering angle of the vehicle body and the speed. In a possible implementation, according to related studies, a yaw velocity steady-state steering gain of the vehicle body includes Formula (1):

$$K_{rd} = \frac{r_1}{\delta}\bigg|_s = \frac{u}{L_1 + K_1 u^2} \quad (1)$$

where $r_1$ represents a yaw velocity of the vehicle body, $\delta$ represents a front wheel steering angle of the vehicle body, $L_1$ represents a wheelbase of the vehicle body, and $K_1$ represents a stability factor of the vehicle body, which depends on a center of mass parameter and a tire cornering stiffness of the vehicle body. The yaw velocity steady-state steering gain of the vehicle body is related to performance of the vehicle body and may be obtained through tests. The yaw velocity $r_1$ of the vehicle body may be acquired by a pose sensor mounted on the vehicle body itself. In this way, the steering angle of the vehicle body that satisfies the comfort is determined based on the experience of a plurality of passengers for the steering angle of the vehicle body; and by inputting the steering angle of the vehicle body, the driving vehicle speed of the vehicle body is determined, thereby further determining the maximum tangential acceleration.

In this embodiment of the present disclosure, the obtained tangential acceleration of the vehicle body is compared with the maximum tangential acceleration. When the tangential acceleration of the vehicle body reaches the preset maximum tangential acceleration, the second vehicle speed of the vehicle body is determined according to the speed of the vehicle body at a previous moment, and the preset maximum acceleration.

In this embodiment of the present disclosure, the second vehicle speed is compared with the first vehicle speed. If the second vehicle speed is smaller than the first vehicle speed, the second vehicle speed is determined as the target vehicle speed. In other words, if the first vehicle speed is relatively fast under a same travel trace, a larger pose variation of the vehicle body is caused by the faster vehicle speed, which further affects the passenger comfort. By comparing with the second vehicle speed, the second vehicle speed that is slower is determined as the target vehicle speed, which can meet a requirement for the passenger comfort, and a passenger can obtain better riding experience.

In the present disclosure, when a vehicle body is in a normal state, a first speed of driving of the vehicle body is determined based on road safety information; and on the premise of ensuring safe driving, a target speed that meets a comfort requirement of a passenger is selected during comprehensive consideration of passenger comfort, thereby facilitating practical application of a unmanned driving vehicle In a possible implementation, the road safety information includes: one or more of information on safely avoiding obstacles, over-the-line driving information, speed-limit information, safe distance information, lane shifting information, and traffic light information.

Figure 2:
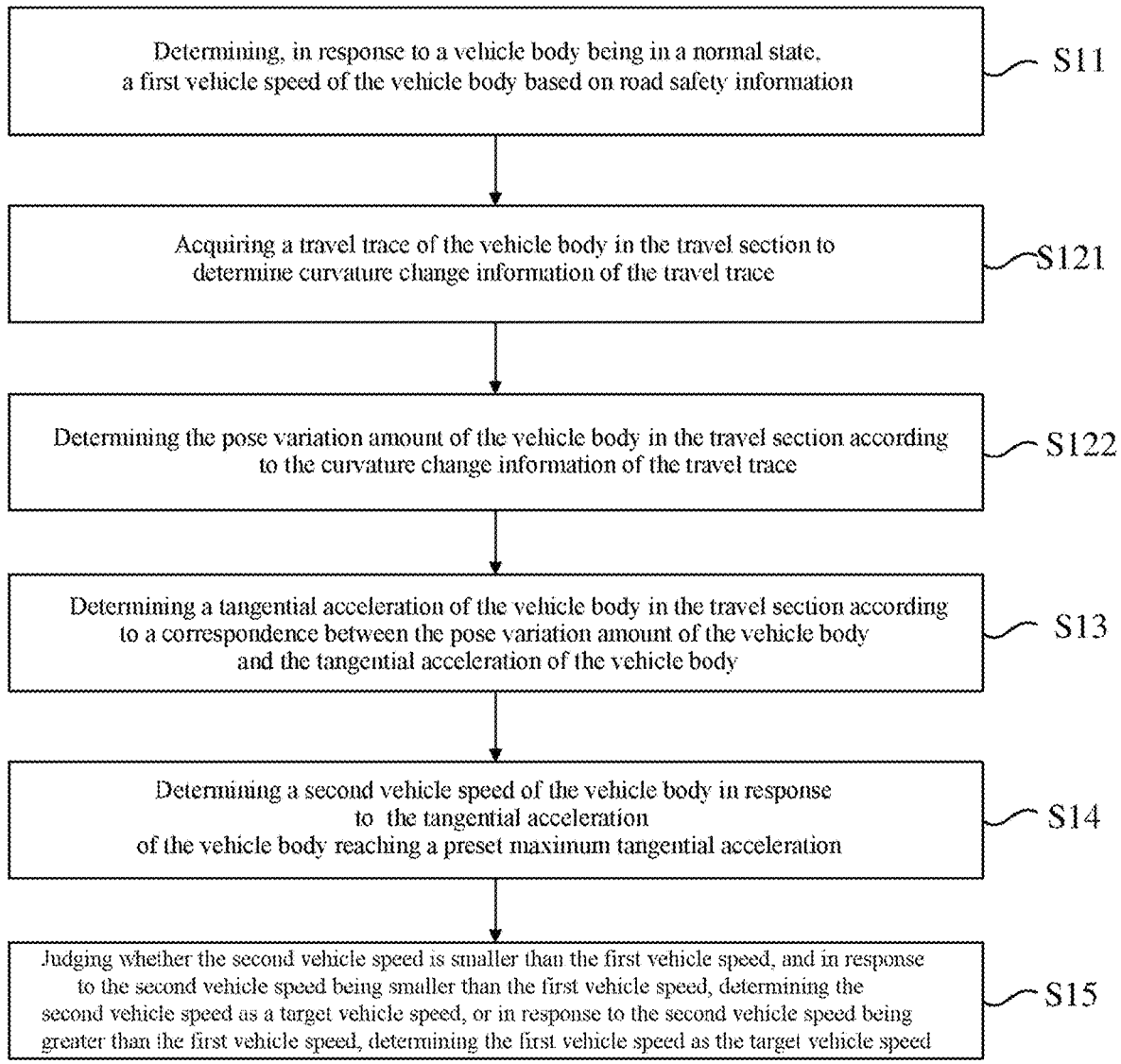
FIG. 2 is a flowchart of a vehicle speed control method according to an exemplary embodiment.

The vehicle speed control method provided in the present disclosure will be described in detail below with reference to FIG. 2. FIG. 2 is a method flowchart of an embodiment of the vehicle speed control method provided in the present disclosure. Although the present disclosure provides method operating steps shown in the following embodiment or drawings, more or fewer operating steps may be included in the method based on conventional effort or uninventive effort. In steps in which there is no necessary causality logically, the execution order of these steps is not limited to an execution order provided in this embodiment of the present disclosure.

Specifically, an embodiment of the vehicle speed control method provided in the present disclosure is shown in FIG. 2. The difference from the foregoing embodiment lies in that: step S12 of acquiring a travel section for the vehicle body to determine a pose variation of the vehicle body in the travel section includes step S121 and step S122:

in step S121, acquiring a travel trace of the vehicle body in the travel section to determine curvature change information of the travel trace; and in step S122, determining the pose variation amount of the vehicle body in the travel section according to the curvature change information of the travel trace.

In this embodiment of the present disclosure, the travel trace includes a curve travel trace which may be regarded as being composed of a series of nodes. At a node where a curvature change is relatively large, a pose variation of the vehicle body is also relatively large. In a possible implementation, a curvature and an arc length of the curve travel trace at a particular node are determined, thereby further determining a tangential direction at the node. Because the tangential direction has an associated correspondence with the pose variation of the vehicle body, pose of the vehicle body at the node and pose variation of the vehicle body at two adjacent nodes are determined, thereby further determining the pose variation amount of the vehicle body in the travel section.

Figure 3:
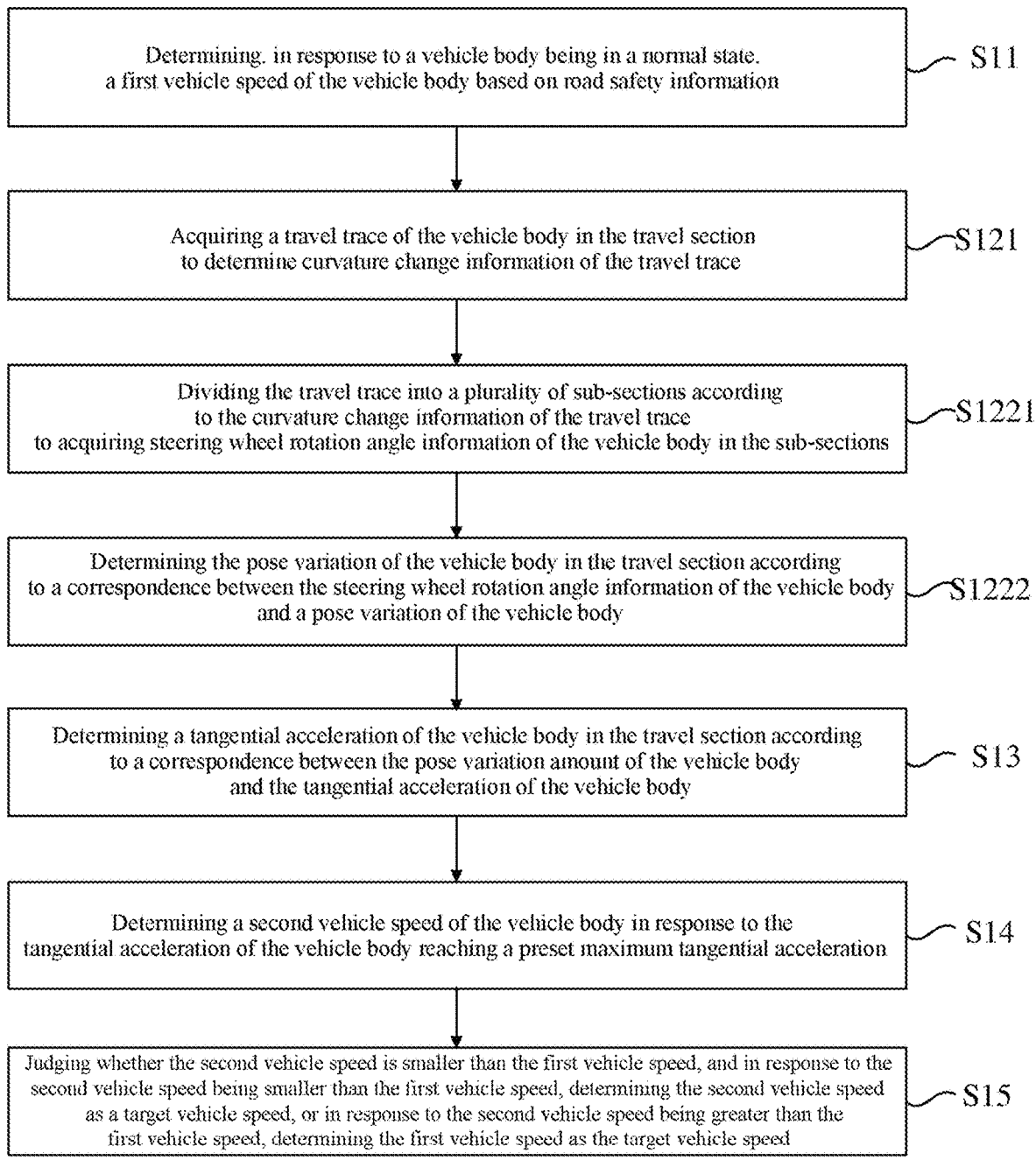
FIG. 3 is a flowchart of a vehicle speed control method according to an exemplary embodiment.

The vehicle speed control method provided in the present disclosure will be described in detail below with reference to FIG. 3. FIG. 3 is a method flowchart of an embodiment of the vehicle speed control method provided in the present disclosure. Although the present disclosure provides method operating steps shown in the following embodiment or drawings, more or fewer operating steps may be included in the method based on conventional effort or uninventive effort. In steps in which there is no necessary causality logically, the execution order of these steps is not limited to an execution order provided in this embodiment of the present disclosure.

Specifically, an embodiment of the vehicle speed control method provided in the present disclosure is shown in FIG. 3. The difference from the foregoing embodiment lies in that: step S122 of determining the pose variation of the vehicle body in the travel section according to the curvature change information of the travel trace includes step S1221 and step S1222:

in step S1221, dividing the travel trace into a plurality of sub-sections according to the curvature change information of the travel trace to acquiring steering wheel rotation angle information of the vehicle body in the sub-sections; and in step S1222, determining the pose variation of the vehicle body in the travel section according to a correspondence between the steering wheel rotation angle information of the vehicle body and a pose variation of the vehicle body.

In this embodiment of the present disclosure, the travel trace may be simulated to divide the travel trace into a plurality of sub-sections. The division may be performed in such a dividing manner that a place with a relatively large curvature change corresponds to a section with a relatively small length, and a place with a relatively small curvature change corresponds to a section with a relatively large length, for example. In a possible implementation, tangential directions at endpoints of the sub-sections are determined, and wheel steering angle information of the vehicle body is obtained through conversion according to the tangential directions; and there is also an associated correspondence between the wheel steering angle of the vehicle body and the steering wheel rotation angle of the vehicle body, and the correspondence may be obtained by reading parameters of a steering wheel controller of the vehicle body.

In one embodiment, the correspondence between the steering wheel rotation angle of the vehicle body and the pose variation of the vehicle body may be obtained through pre-tests. The correspondence may include: when the steering wheel of the vehicle body rotates clockwise, it corresponds to a right turn of the vehicle body; and when the steering wheel of the vehicle body rotates counterclockwise, it corresponds to a left turn of the vehicle body. Furthermore, rotation angles of the steering wheel of the vehicle body may one-to-one correspond to steering angles of the vehicle body.

Therefore, the pose variation amount of the vehicle body in the travel section may be determined according to the correspondence between the steering wheel rotation angle information of the vehicle body and the pose variation of the vehicle body.

Figure 4:
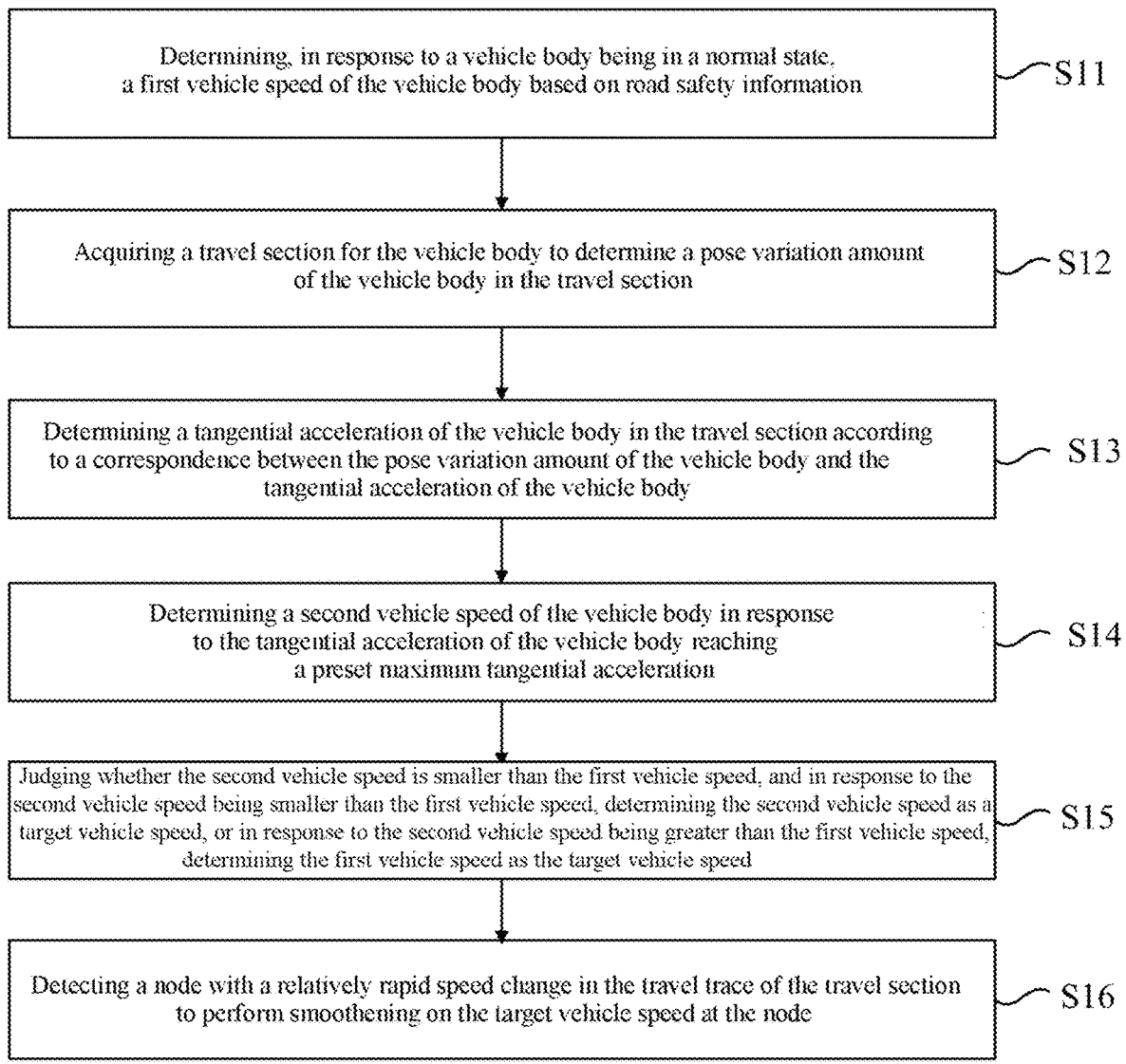
FIG. 4 is a flowchart of a vehicle speed control method according to an exemplary embodiment.

The vehicle speed control method provided in the present disclosure will be described in detail below with reference to FIG. 4. FIG. 4 is a method flowchart of an embodiment of the vehicle speed control method provided in the present disclosure. Although the present disclosure provides method operating steps shown in the following embodiment or drawings, more or fewer operating steps may be included in the method based on conventional effort or uninventive effort. In steps in which there is no necessary causality logically, the execution order of these steps is not limited to an execution order provided in this embodiment of the present disclosure.

Specifically, an embodiment of the vehicle speed control method provided in the present disclosure is shown in FIG. 4. The difference from the foregoing embodiment lies in that the method further includes:

step S16 of detecting a node with a relatively rapid speed change in the travel trace of the travel section to perform smoothening on the target vehicle speed at the node.

In this embodiment of the present disclosure, the node with a relatively rapid speed change may include a node at which a curvature of the travel trace changes suddenly and a node at which switching is performed between the first vehicle speed and the second vehicle speed. In a possible implementation, smoothening may be performed on the target vehicle speed by using a speed smooth interpolation method. Specifically, when the sudden change in the curvature of the pre-estimated travel trace is detected, a relatively smooth curve is found next to the node to replace the pre-estimated travel trace as an actual travel trace. A maximum allowable value of error, for example, a chordal tolerance, needs to be determined between the actual travel trace curve and the pre-estimated travel trace. In related technological researches, related calculation is performed on an interpolation speed, to obtain Formula (2)

$$V(u_i) = \frac{2}{T_s}\sqrt{\rho_i^2 - (\rho_i - \delta_i)^2} \quad (2)$$

where $\delta$ and $\rho$ respectively represent a chordal tolerance and a radius of curvature.

Figure 5:
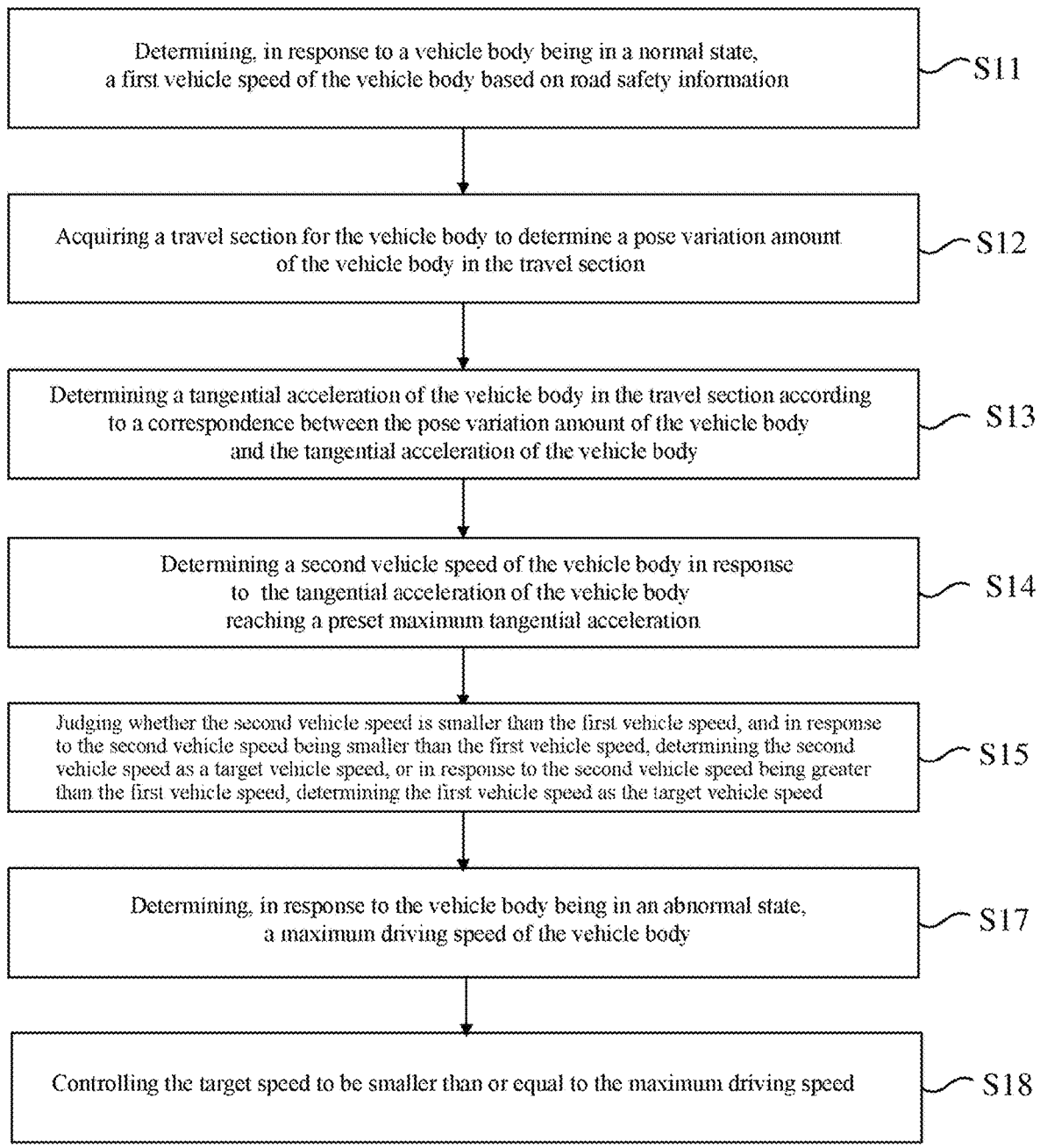
FIG. 5 is a flowchart of a vehicle speed control method according to an exemplary embodiment.

The vehicle speed control method provided in the present disclosure will be described in detail below with reference to FIG. 5. FIG. 5 is a method flowchart of an embodiment of the vehicle speed control method provided in the present disclosure. Although the present disclosure provides method operating steps shown in the following embodiment or drawings, more or fewer operating steps may be included in the method based on conventional effort or uninventive effort. In steps in which there is no necessary causality logically, the execution order of these steps is not limited to an execution order provided in this embodiment of the present disclosure.

Specifically, an embodiment of the vehicle speed control method provided in the present disclosure is shown in FIG. 5. The difference from the foregoing embodiment lies in that the method further includes step S17 and step S18:

in step S17, determining, in response to the vehicle body being in an abnormal state, a maximum driving speed of the vehicle body; and in step S18, controlling the target speed to be smaller than or equal to the maximum driving speed.

In this embodiment of the present disclosure, the vehicle body state information includes working states of components of the vehicle body, including normal working states and fault states. When the vehicle body is in a fault state, such as, a sensor breakage, a controller failure, or the like, the vehicle speed is required to maintain a relatively low maximum driving speed, so as to avoid accidents. The maximum driving speed may be obtained through experiments, or may be set according to types of materials loaded on the vehicle body before the vehicle body departs. For example, when the vehicle body is loaded with fragile materials, the maximum driving speed of the vehicle body may be preset. The maximum driving speed is a maximum driving speed for the entire journey. When the target vehicle speed is greater than the maximum driving speed, the vehicle speed may be controlled by releasing an accelerator and starting a brake, so that the target vehicle speed is smaller than or equal to the maximum driving speed.

Figure 6:
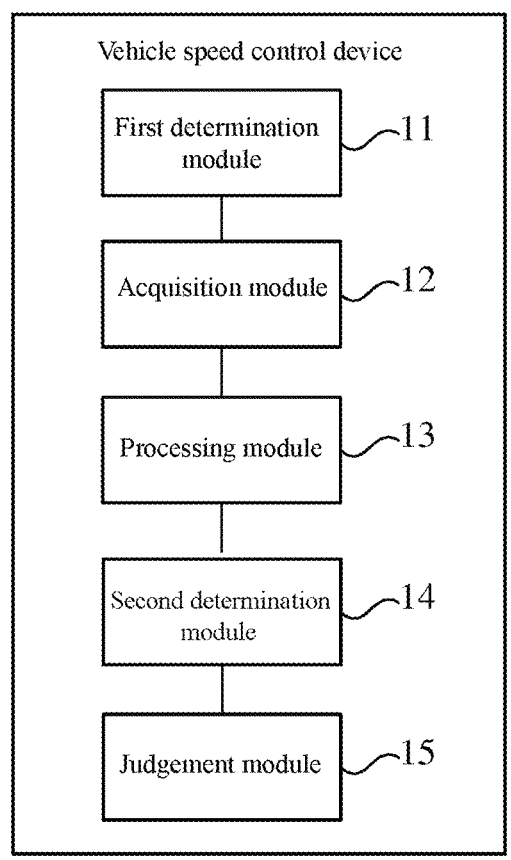
FIG. 6 is a block diagram of a vehicle speed control device according to an exemplary embodiment.

A vehicle speed control device provided in the present disclosure will be described in detail below with reference to FIG. 6. FIG. 6 is a device block diagram of an embodiment of the vehicle speed control device provided in the present disclosure.

The vehicle speed control device includes a first determination module 11 is configured to determine, in response to a vehicle body being in a normal state, a first vehicle speed of the vehicle body based on road safety information;

an acquisition module 12 is configured to acquire a travel section for the vehicle body to determine a pose variation amount of the vehicle body in the travel section;

a processing module 13 is configured to determine a tangential acceleration of the vehicle body in the travel section according to a correspondence between the pose variation amount of the vehicle body and the tangential acceleration of the vehicle body;

a second determination module 14 is configured to determine, in response to the tangential acceleration of the vehicle body reaching a preset maximum tangential acceleration, a second vehicle speed of the vehicle body; and a judgment module 15 is configured to judge whether the second vehicle speed is smaller than the first vehicle speed; in response to the second vehicle speed being smaller than the first vehicle speed, determine the second vehicle speed as a target vehicle speed, and in response to the second vehicle speed being greater than the first vehicle speed, determine the first vehicle speed as the target vehicle speed.

In a possible implementation, the road safety information includes: one or more of information on safely avoiding obstacles, over-the-line driving information, speed-limit information, safe distance information, lane shifting information, and traffic light information.

Figure 7:
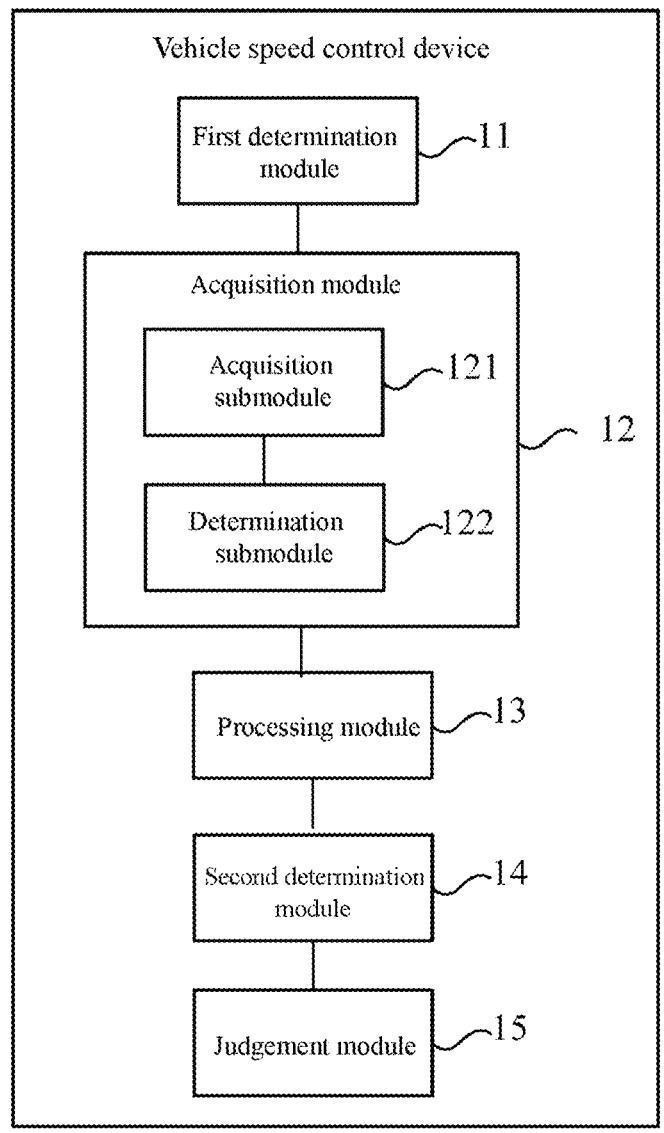
FIG. 7 is a block diagram of a vehicle speed control device according to an exemplary embodiment.

The vehicle speed control device provided in the present disclosure will be described in detail below with reference to FIG. 7. FIG. 7 is a device block diagram of an embodiment of the vehicle speed control device provided in the present disclosure. The difference from the foregoing embodiment lies in that the acquisition module 12 includes:

an acquisition submodule 121, configured to acquire a travel trace of the vehicle body in the travel section; and a determination submodule 122, configured to determine the pose variation of the vehicle body in the travel section according to curvature change information of the travel trace.

Figure 8:
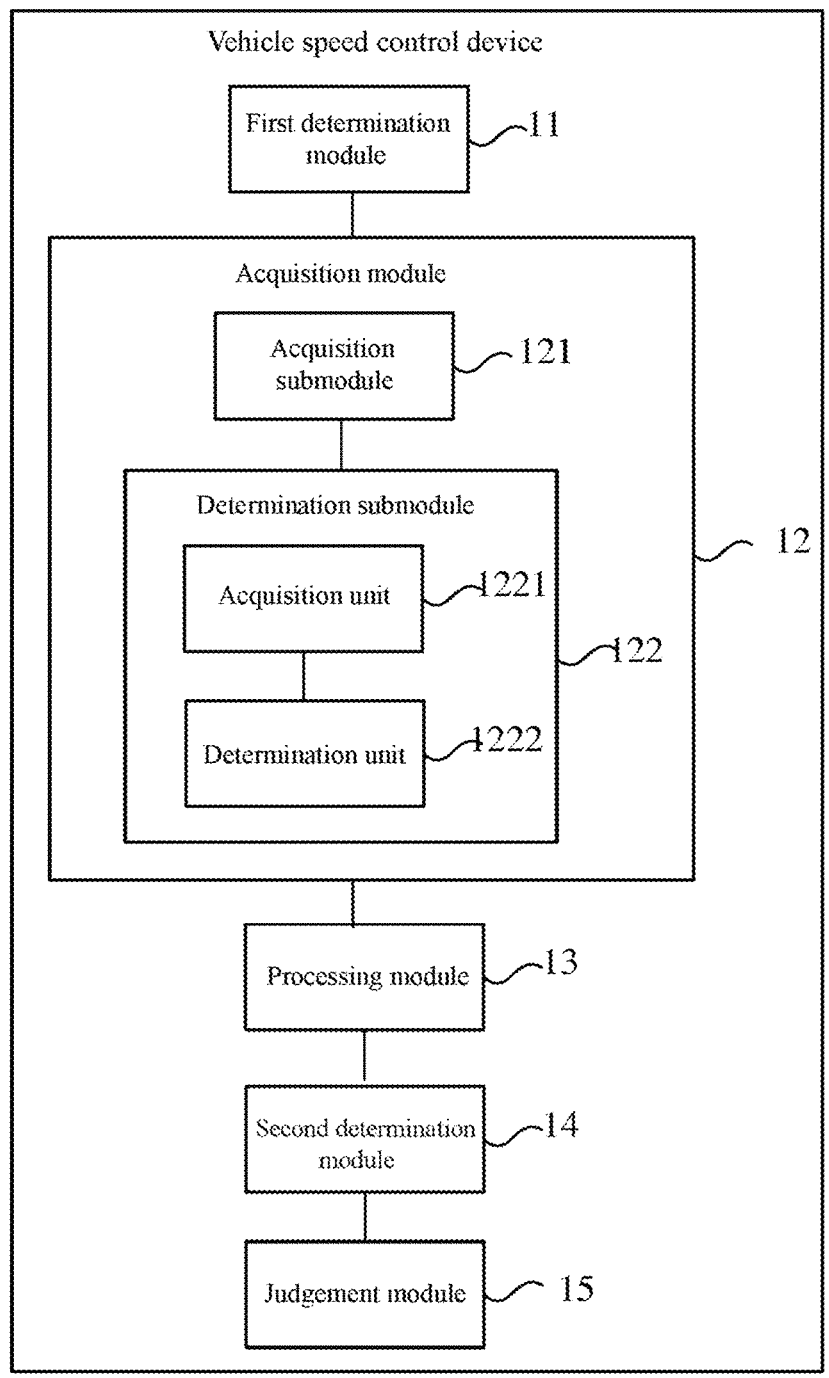
FIG. 8 is a block diagram of a vehicle speed control device according to an exemplary embodiment.

The vehicle speed control device provided in the present disclosure will be described in detail below with reference to FIG. 8. FIG. 8 is a device block diagram of an embodiment of the vehicle speed control device provided in the present disclosure. The difference from the foregoing embodiment lies in that the determination submodule 122 includes:

an acquisition unit 1221, configured to divide the travel trace into a plurality of sub-sections according to the curvature change information of the travel trace, and acquire steering wheel rotation angle information of the vehicle body in the sub-sections; and a determination unit 1222, configured to determine the pose variation amount of the vehicle body in the travel section according to a correspondence between the steering wheel rotation angle information of the vehicle body and a pose variation of the vehicle body.

Figure 9:
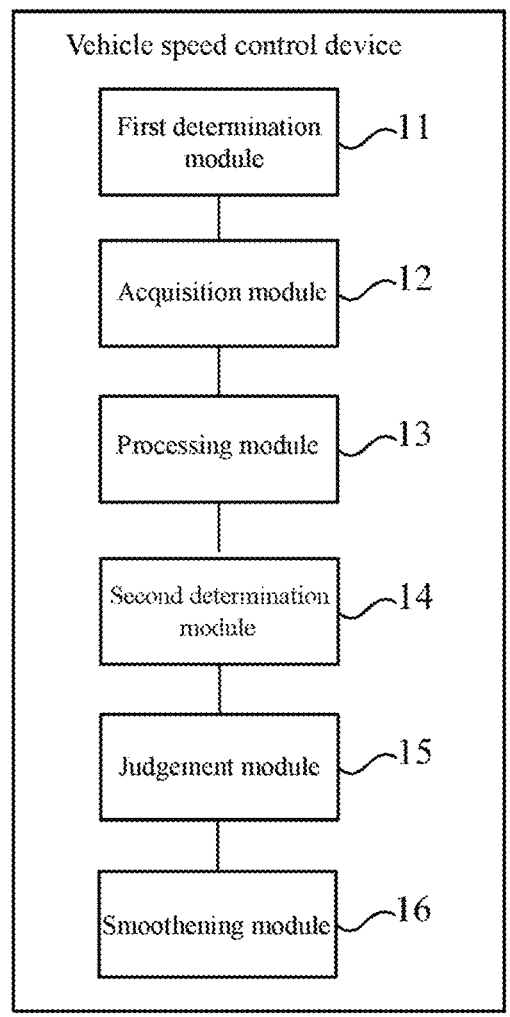
FIG. 9 is a block diagram of a vehicle speed control device according to an exemplary embodiment.

The vehicle speed control device provided in the present disclosure will be described in detail below with reference to FIG. 9. FIG. 9 is a device block diagram of an embodiment of the vehicle speed control device provided in the present disclosure. The difference from the foregoing embodiment lies in that the device further includes a smoothening module 16.

The smoothening module 16 is configured to detect a node with a relatively rapid speed change in the travel trace to perform smoothening on the target vehicle speed at the node.

Figure 10:
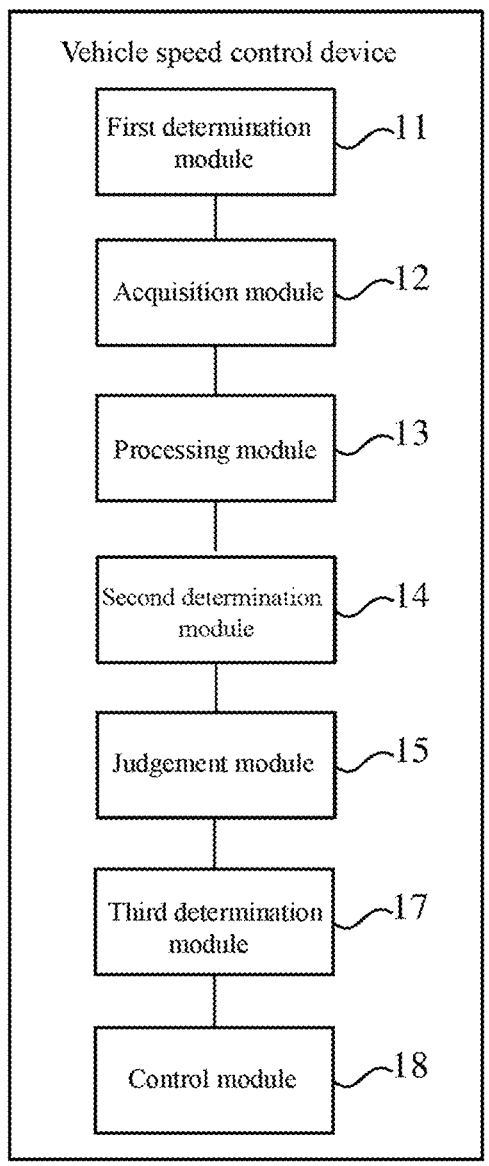
FIG. 10 is a block diagram of a vehicle speed control device according to an exemplary embodiment.

The vehicle speed control device provided in the present disclosure will be described in detail below with reference to FIG. 10. FIG. 10 is a device block diagram of an embodiment of the vehicle speed control device provided in the present disclosure. The difference from the foregoing embodiment lies in that the device further includes:

a third determination module 17, configured to determine, in response to the vehicle body being in an abnormal state, a maximum driving speed of the vehicle body; and a control module 18, configured to control the target vehicle speed to be smaller than or equal to the maximum driving speed of the vehicle body.

With respect to the device in the foregoing embodiment, the specific manners for performing operations by the modules have been described in detail in the embodiment regarding the method, and will not be elaborated herein.

Figure 11:
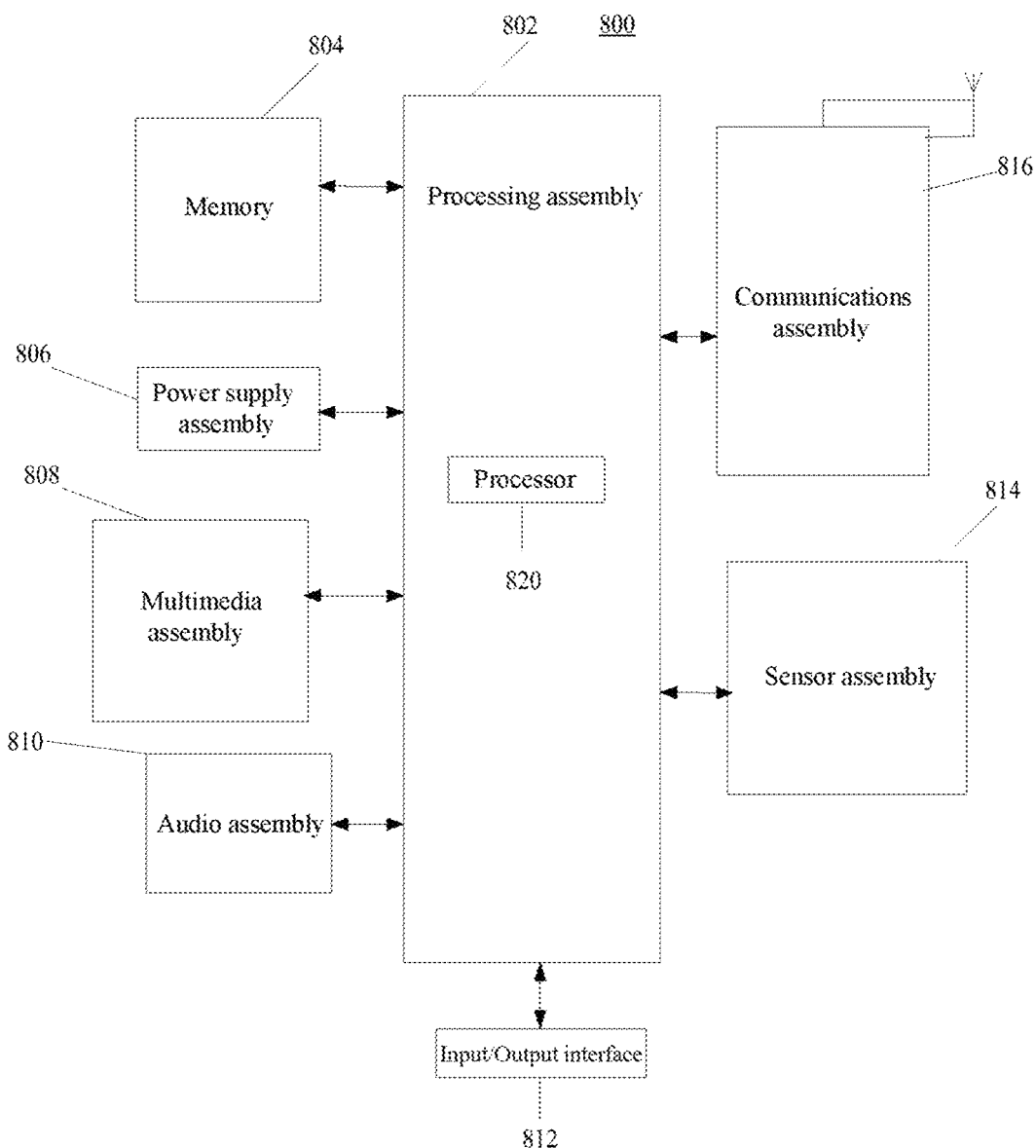
FIG. 11 is a block diagram of a vehicle speed control device according to an exemplary embodiment.

FIG. 11 is a block diagram of a device 800 for navigation according to an exemplary embodiment. For example, the device 800 may be a mobile phone, a computer, a digital broadcast terminal, a message transceiver device, a game console, a tablet device, a medical device, exercise equipment, a personal digital assistant, or the like.

Referring to FIG. 11, the device 800 may include one or more of the following components: a processing assembly 802, a memory 804, a power supply assembly 806, a multimedia assembly 808, an audio assembly 810, an input/output (I/O) interface 812, a sensor assembly 814, and a communications assembly 816.

The processing assembly 802 usually controls overall operations of the device 800, such as operations associated with display, telephone calls, data communication, camera operations, and recording operations. The processing assembly 802 may include one or more processors 820 to execute instructions, to perform all or some of the steps in the above-mentioned method. Moreover, the processing assembly 802 may include one or more modules to facilitate interaction between the processing assembly 802 and another assembly. For example, the processing assembly 802 may include a multimedia module to facilitate interaction between the multimedia assembly 808 and the processing assembly 802.

The memory 804 is configured to store various types of data to support operations on the device 800. Examples of such data include instructions for any application or method operated on the device 800, contact data, phonebook data, messages, pictures, videos, and the like. The memory 804 may be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power supply assembly 806 provides power for various components of the device 800. The power supply assembly 806 may include a power management system, one or more power supplies, and other components associated with generation, management, and distribution of power for the device 800.

The multimedia assembly 808 includes a screen providing an output interface between the device 800 and a user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touch, slide, and gestures on the touch panel. The touch sensors may not only sense a boundary of a touch or slide action but also detect duration and pressure associated with the touch or slide operation. In some embodiments, the multimedia assembly 808 includes a front-facing camera and/or a rear-facing camera. The front-facing camera and/or the rear-facing camera may receive external multimedia data when the device 800 is in an operation mode, such as a photographing mode or a video mode. Each front-facing camera or the rear-facing camera may be a fixed optical lens system or have focusing and optical zooming capabilities.

The audio assembly 810 is configured to output and/or input an audio signal. For example, the audio assembly 810 includes a microphone (MIC), and the microphone is configured to receive an external audio signal when the device 800 is in the operation mode, such as a call mode, a recording mode, and a speech recognition mode. The received audio signal may be further stored in the memory 804 or sent by using the communications assembly 816. In some embodiments, the audio assembly 810 further includes a speaker configured to output the audio signal.

The I/O interface 812 provides an interface between the processing assembly 802 and a peripheral interface module, and the peripheral interface module may be a keyboard, a click wheel, a button, or the like. The button may include, but not limited to: a home button, a volume button, a starting button, and a locking button.

The sensor assembly 814 includes one or more sensors, configured to provide status assessment in various aspects for the device 800. For example, the sensor assembly 814 may detect an on/off status of the device 800 and relative positioning of components. For example, the components are a display and a small keyboard of the device 800. The sensor assembly 814 may further detect a change in a position of the device 800 or a component of the device 800, presence or absence of contact between the user and the device 800, orientation or acceleration/deceleration of the device 800, and a change in temperature of the device 800. The sensor assembly 814 may include a proximity sensor, configured to detect presence of an object nearby without any physical contact. The sensor assembly 814 may further include a light sensor, such as a CMOS or CCD image sensor, configured for use in an imaging application. In some embodiments, the sensor assembly 814 may further include an acceleration sensor, a gyroscope sensor, a magnetic sensor, a pressure sensor or a temperature sensor.

The communications assembly 816 is configured to facilitate wired or wireless communication between the device 800 and another device. The device 800 may access a communication-standard-based wireless network, such as a WiFi, 2G, or 3G network or a combination thereof. In an exemplary embodiment, the communications assembly 816 receives a broadcast signal or broadcast associated information from an external broadcast management system through a broadcast channel. In an exemplary embodiment, the communications assembly 816 further includes a near field communication (NFC) module to facilitate short-range communication. For example, the NFC module may be implemented based on a radio frequency identification (RFID) technology, an infrared data association (IrDA) technology, an ultra-wide band (UWB) technology, a Bluetooth (BT) technology, and another technology.

In an exemplary embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, and is configured to perform the abovementioned method.

In an exemplary embodiment, a non-transitory computer-readable storage medium including an instruction, such as the memory 804 including an instruction, is further provided, and the instruction may be executed by the processor 820 of the device 800 to implement the abovementioned method. For example, the non-transitory computer-readable storage medium may be a ROM, a random access memory (RAM), a CD-ROM, a magnetic tape, a floppy disc, an optical data storage device, or the like.

Figure 12:
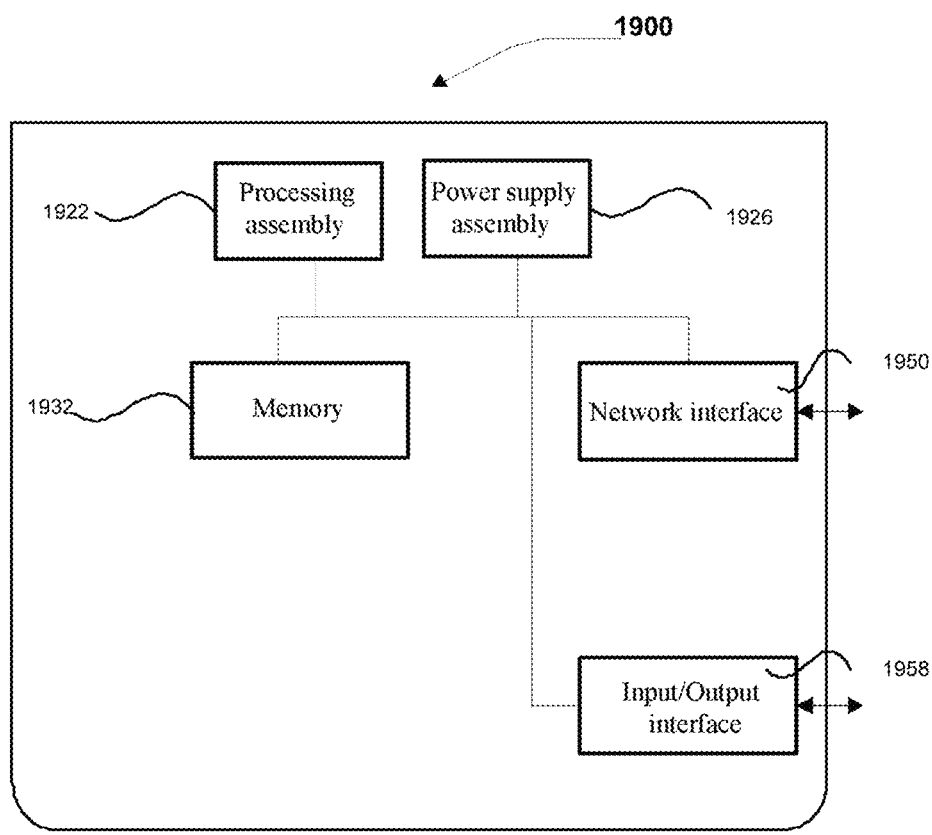
FIG. 12 is a block diagram of a vehicle speed control device according to an exemplary embodiment.

FIG. 12 is a block diagram of a device 1900 for navigation according to an exemplary embodiment. For example, the device 1900 may be provided as a server. Referring to FIG. 12, the device 1900 includes a processing assembly 1922, further including one or more processors, and a memory resource that is represented by a memory 1932 and that is configured to store an instruction executable for the processing assembly 1922, for example, an application. The application stored in the memory 1932 may include one or more modules with each corresponding to a set of instructions. In addition, the processing assembly 1922 is configured to execute the instruction to perform the above navigation method.

The device 1900 may further include a power supply assembly 1926 configured to execute power management of the device 1900, a wired or wireless network interface 1950 configured to connect the device 1900 to a network, and an input/output (I/O) interface 1958. The device 1900 may be operated based on an operating system stored in the memory 1932, for example, Windows Server™, Mac OS X™, Unix™, Linux™, FreeBSD™ or the like.

In an exemplary embodiment, a non-transitory computer-readable storage medium including an instruction, such as the memory 1932 including an instruction, is further provided, and the instruction may be executed by the processing assembly 1922 of the device 1900 to complete the abovementioned method. For example, the non-transitory computer-readable storage medium may be a ROM, a random access memory (RAM), a CD-ROM, a magnetic tape, a floppy disc, an optical data storage device, or the like.

Other implementation solutions of the present disclosure will be easily conceived of by a person skilled in the art after consideration of the specification and practice of the invention disclosed herein. This application is intended to cover any variation, use, or adaptive change of the present disclosure. These variations, uses, or adaptive changes follow the general principles of the present disclosure and include common knowledge or common technical means in the art that is not disclosed in the present disclosure. The specification and embodiments are only considered as exemplary, and a true scope and spirit of the present disclosure are pointed by the appended claims.

It should be understood that the present disclosure is not limited to the precise structure that has been described above and illustrated in the accompanying drawings, and that various modifications and changes may be made without departing from the scope thereof. The scope of the present disclosure is limited only by the appended claims.

What is claimed is:

1. A vehicle speed control method for an unmanned driving vehicle, comprising:
   in response to a vehicle body of the unmanned driving vehicle being in a normal state, determining, by a processor, a first vehicle speed of the vehicle body that enables the vehicle body to follow a planned trace based on road safety information;
   detecting, by a sensing device on the vehicle body, a travel section at which the vehicle body is traveling to determine a pose variation amount of the vehicle body in the travel section;
   determining a tangential acceleration of the vehicle body along a travel trace in the travel section, by the processor, based on the pose variation amount and a predetermined correspondence between the pose variation amount of the vehicle body and the tangential acceleration of the vehicle body;
   in response to the tangential acceleration of the vehicle body reaching a preset maximum tangential acceleration, determining a second vehicle speed of the vehicle body by the processor;
   judging whether the second vehicle speed is smaller than the first vehicle speed by the processor;
   in response to the second vehicle speed being smaller than the first vehicle speed, determining the second vehicle speed as a target vehicle speed by the processor, and in response to the second vehicle speed being greater than the first vehicle speed, determining the first vehicle speed as the target vehicle speed by the processor; and
   controlling the unmanned driving vehicle to travel at the target vehicle speed.

2. The method according to claim 1, wherein the road safety information comprises:
   one or more of information on safely avoiding obstacles, over-the-line driving information, speed-limit information, safe distance information, lane shifting information, and traffic light information.

3. The method according to claim 1, wherein said detecting, by the sensing device on the vehicle body, the travel section at which the vehicle body is traveling to determine a pose variation amount of the vehicle body in the travel section comprises:
- simulating the travel trace of the vehicle body in the travel section to determine curvature change information of the travel trace; and
- determining the pose variation amount of the vehicle body in the travel section according to the curvature change information of the travel trace.

4. The method according to claim 3, wherein said determining the pose variation amount of the vehicle body in the travel section according to the curvature change information of the travel trace comprises:
- dividing the travel trace into a plurality of sub-sections according to the curvature change information of the travel trace to acquire steering wheel rotation angle information of the vehicle body in the sub-sections; and
- determining the pose variation amount of the vehicle body in the travel section according to a correspondence between the steering wheel rotation angle information of the vehicle body and a pose variation of the vehicle body.

5. The method according to claim 1, further comprising:
- detecting a node at which switching is performed between the first vehicle speed and the second vehicle speed to perform smoothening on the target vehicle speed at the node.

6. The method according to claim 1, further comprising:
- in response to the vehicle body being in an abnormal state, determining a maximum driving speed of the vehicle body; and
- controlling the target vehicle speed to be smaller than or equal to the maximum driving speed of the vehicle body.

7. A vehicle speed control device for an unmanned driving vehicle, comprising:
- a processor; and
- a memory configured to store an instruction executable for the processor, wherein the processor is configured to perform operations comprising:
  - in response to a vehicle body of the unmanned driving vehicle being in a normal state, determining, by the processor, a first vehicle speed of the vehicle body that enables the vehicle body to follow a planned trace based on road safety information;
  - detecting, by a sensing device on the vehicle body, a travel section at which the vehicle body is traveling to determine a pose variation amount of the vehicle body in the travel section;
  - determining a tangential acceleration of the vehicle body along a travel trace in the travel section, by the processor, based on the pose variation amount and a predetermined correspondence between the pose variation amount of the vehicle body and the tangential acceleration of the vehicle body;
  - in response to the tangential acceleration of the vehicle body reaching a preset maximum tangential acceleration, determining a second vehicle speed of the vehicle body by the processor;
  - judging whether the second vehicle speed is smaller than the first vehicle speed by the processor;
  - in response to the second vehicle speed being smaller than the first vehicle speed, determining the second vehicle speed as a target vehicle speed by the processor, and in response to the second vehicle speed being greater than the first vehicle speed, determining the first vehicle speed as the target vehicle speed by the processor; and
  - controlling the unmanned driving vehicle to travel at the target vehicle speed.

8. The device according to claim 7, wherein the road safety information comprises:
- one or more of information on safely avoiding obstacles, over-the-line driving information, speed-limit information, safe distance information, lane shifting information, and traffic light information.

9. The device according to claim 7, wherein said detecting, by the sensing device on the vehicle body, the travel section at which the vehicle body is traveling to determine a pose variation amount of the vehicle body in the travel section comprises:
- simulating the travel trace of the vehicle body in the travel section to determine curvature change information of the travel trace; and
- determining the pose variation amount of the vehicle body in the travel section according to the curvature change information of the travel trace.

10. The device according to claim 9, wherein said determining the pose variation amount of the vehicle body in the travel section according to the curvature change information of the travel trace comprises:
- dividing the travel trace into a plurality of sub-sections according to the curvature change information of the travel trace to acquire steering wheel rotation angle information of the vehicle body in the sub-sections; and
- determining the pose variation amount of the vehicle body in the travel section according to a correspondence between the steering wheel rotation angle information of the vehicle body and a pose variation of the vehicle body.

11. The device according to claim 7, wherein the processor is further configured to:
- detect a node on which switching is performed between the first vehicle speed and the second vehicle speed to perform smoothening on the target vehicle speed at the node.

12. The device according to claim 7, wherein the processor is further configured to:
- in response to the vehicle body being in an abnormal state, determine a maximum driving speed of the vehicle body; and
- control the target vehicle speed to be smaller than or equal to the maximum driving speed of the vehicle body.

13. A non-transitory computer-readable storage medium, wherein when an instruction in the storage medium is executed by a processor, the processor is enabled to perform operations for an unmanned driving vehicle comprising:
- in response to a vehicle body of the unmanned driving vehicle being in a normal state, determining, by the processor, a first vehicle speed of the vehicle body that enables the vehicle body to follow a planned trace based on road safety information;
- detecting, by a sensing device on the vehicle body, a travel section at which the vehicle body is traveling to determine a pose variation amount of the vehicle body in the travel section;
- determining a tangential acceleration of the vehicle body along a travel trace in the travel section, by the processor, based on the pose variation amount and a predetermined correspondence between the pose variation amount of the vehicle body and the tangential acceleration of the vehicle body;

in response to the tangential acceleration of the vehicle body reaching a preset maximum tangential acceleration, determining a second vehicle speed of the vehicle body by the processor;

judging whether the second vehicle speed is smaller than the first vehicle speed by the processor;

in response to the second vehicle speed being smaller than the first vehicle speed, determining the second vehicle speed as a target vehicle speed by the processor, and in response to the second vehicle speed being greater than the first vehicle speed, determining the first vehicle speed as the target vehicle speed by the processor; and controlling the unmanned driving vehicle to travel at the target vehicle speed.

14. The non-transitory computer-readable storage medium according to claim 13, wherein the road safety information comprises:

one or more of information on safely avoiding obstacles, over-the-line driving information, speed-limit information, safe distance information, lane shifting information, and traffic light information.

15. The non-transitory computer-readable storage medium according to claim 13, wherein said detecting, by the sensing device on the vehicle body, the travel section at which the vehicle body is traveling to determine a pose variation amount of the vehicle body in the travel section comprises:

simulating the travel trace of the vehicle body in the travel section to determine curvature change information of the travel trace; and determining the pose variation amount of the vehicle body in the travel section according to the curvature change information of the travel trace.

16. The non-transitory computer-readable storage medium according to claim 15, wherein said determining the pose variation amount of the vehicle body in the travel section according to the curvature change information of the travel trace comprises:

dividing the travel trace into a plurality of sub-sections according to the curvature change information of the travel trace to acquire steering wheel rotation angle information of the vehicle body in the sub-sections; and determining the pose variation amount of the vehicle body in the travel section according to a correspondence between the steering wheel rotation angle information of the vehicle body and a pose variation of the vehicle body.

17. The non-transitory computer-readable storage medium according to claim 13, wherein the processor is further configured to:

detect a node on which switching is performed between the first vehicle speed and the second vehicle speed to perform smoothening on the target vehicle speed at the node.

18. The non-transitory computer-readable storage medium according to claim 13, wherein the processor is further configured to:

in response to the vehicle body being in an abnormal state, determine a maximum driving speed of the vehicle body; and control the target vehicle speed to be smaller than or equal to the maximum driving speed of the vehicle body.

* * * * *